United States Patent [19]

Moertel

[11] 4,329,311
[45] May 11, 1982

[54] METHOD AND APPARATUS FOR FOLDING AND FORMING TRAINS OF SLIDE FASTENER ELEMENTS

[75] Inventor: George B. Moertel, Conneautville, Pa.

[73] Assignee: Talon, Inc., Meadville, Pa.

[21] Appl. No.: 191,597

[22] Filed: Sep. 29, 1980

[51] Int. Cl.³ .............................................. B29D 5/00
[52] U.S. Cl. .................................... 264/285; 264/295; 264/320
[58] Field of Search ........................ 264/285, 295, 320

[56] References Cited

U.S. PATENT DOCUMENTS

| | | | |
|---|---|---|---|
| 2,779,388 | 1/1957 | Quoss | 264/285 X |
| 3,106,749 | 10/1963 | Streicher | 18/13 |
| 3,320,225 | 5/1967 | Brodbury | 264/295 X |
| 3,445,915 | 4/1969 | Cuckson et al. | 264/295 |
| 3,908,242 | 9/1975 | Reynolds | 24/205.13 L |
| 3,993,724 | 11/1976 | Takamatsu | 264/295 X |
| 4,025,277 | 5/1977 | Monroe | 425/383 |

FOREIGN PATENT DOCUMENTS 575938 4/1958 Italy .

Primary Examiner—Thomas P. Pavelko
Attorney, Agent, or Firm—O'Brien & Marks

[57] ABSTRACT

An apparatus for folding and forming a continuous train of slide fastener coupling element bodies into a train of coupling elements includes a rotating forming disc against which the coupling element bodies are fed. The train is held on the forming disc for a portion of the disc rotation by a pair of flexible discs which clamp the leg portions of the bodies against the sides of the forming disc. After rotation through a portion of the forming disc circumference, the flexible discs are cammed outwardly and the train of coupling elements is pulled from the discs.

9 Claims, 12 Drawing Figures

METHOD AND APPARATUS FOR FOLDING AND FORMING TRAINS OF SLIDE FASTENER ELEMENTS

BACKGROUND OF THE INVENTION

1. Field of the Invention

The invention relates to the manufacture of slide fasteners and particularly to methods and apparatus for folding and forming continuous trains of coupling elements, such as coupling elements molded flat on interconnecting threads.

2. Description of the Prior Art

The prior art, as exemplified in U.S. Pat. Nos. 3,445,915, 4,025,277 and 4,101,360, contains methods and apparatus for folding and forming continuous trains of thermoplastic elements which are initially molded in flattened form on interconnecting threads. In one prior art process, the train is reeled after molding and then dereeled and fed to a folding unit where the train is folded. The thermoplastic elements must be heated by energy supplied to the folding unit to bring the elements to a softened state so that they can be folded into a U-shape.

SUMMARY OF THE INVENTION

In accordance with the invention a method of folding and forming a continuous train of flat slide fastener coupling element bodies into a train of slide fastener coupling elements includes rotating a forming disc, feeding the flat element bodies of the train of flat coupling element bodies in a heated condition to the periphery of the rotating forming disc, folding leg portions of the element bodies onto opposite sides of the forming disc, engaging a pair of flexible discs with the folded leg portions on opposite sides of the forming disc, maintaining the engagement of the discs with the folded leg portions for a portion of the forming disc rotation to form the train of slide fastener coupling elements, and removing the train of slide fastener coupling elements from the forming disc.

An object of the invention is to provide new and more efficient methods and apparatus for folding and forming coupling element trains wherein compact, simple and easy to maintain apparatus is employed.

Another object of the invention is to prevent deterioration of coupling element strength in the folding of flat element bodies.

It is another object of the invention to eliminate unnecessary steps as well as to reduce the energy required to form coupling element trains.

Other objects, advantages and features will become apparent from the following description when taken in conjunction with the drawings.

DESCRIPTION OF THE PREFERRED EMBODIMENT

Figure 1:
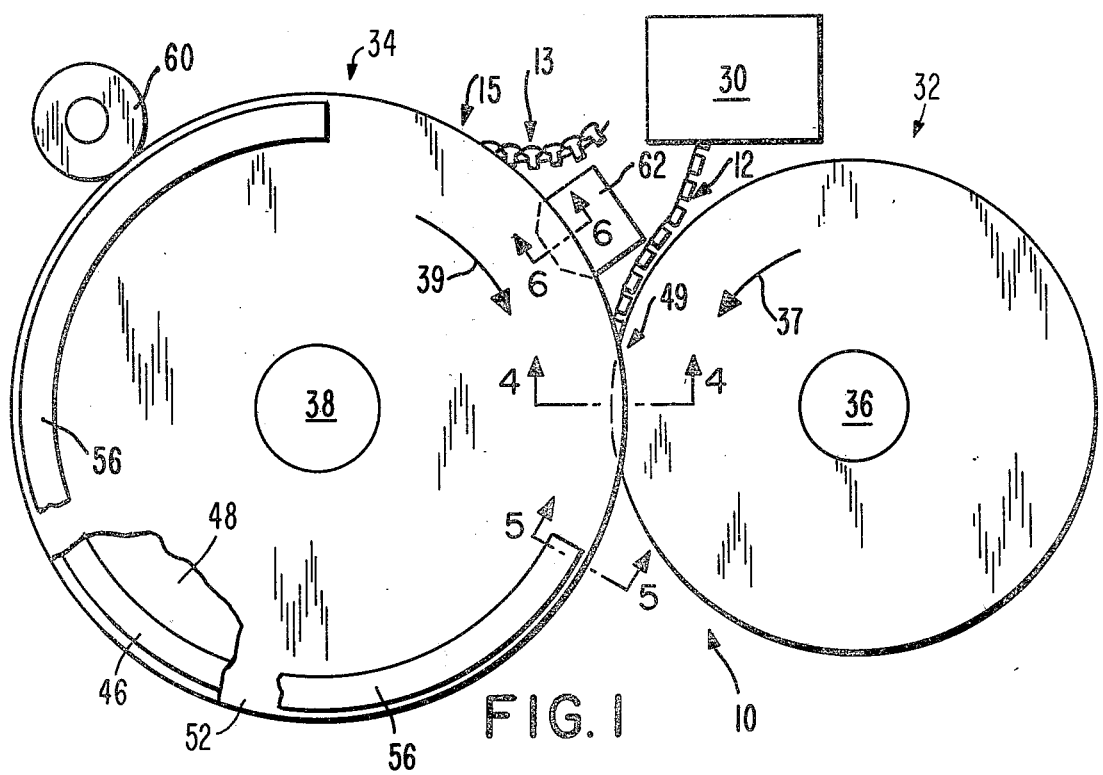
FIG. 1 is a diagrammatic view of an apparatus for folding and forming flat coupling element bodies into coupling elements in accordance with the invention.

As shown in FIG. 1, an apparatus, indicated generally at 10, for folding and forming a continuous train, indicated generally at 12, of flat slide fastener element bodies into a train, indicated generally at 13, of slide fastener coupling elements in accordance with the invention includes a press or forming wheel mechanism indicated generally at 34 and a folding wheel mechanism indicated generally at 32. The train 12 is formed by a conventional molding apparatus 30 and is then fed, while still in a heated condition, from the molding apparatus 30 to the forming wheel 34 at an entry station indicated generally at 49 where the folding wheel 32 folds the elements. The folded elements are formed or set during continued rotation of the wheel 34 until they are removed from the wheel 34 at a point indicated generally at 15.

Figure 2:
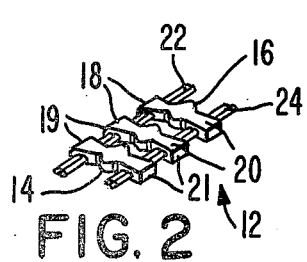
FIG. 2 is a perspective view of a train of flat coupling element bodies prior to folding in the apparatus of FIG. 1.
Figure 3:
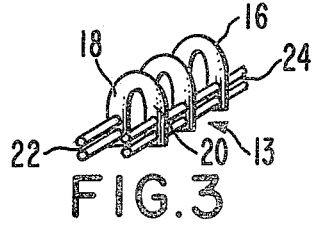
FIG. 3 is a perspective view of train of coupling elements folded in accordance with the invention.
Figure 6:
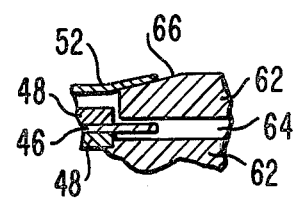
FIG. 6 is a cross-sectional view taken along the line 6—6 of FIG. 1 of a broken-away portion of the apparatus.

The train 12, shown in FIG. 2, includes a series of spaced-apart molded slide fastener coupling element bodies 14 formed from a polymer resin such as one of the thermoplastic resins e.g. nylon 6, nylon 6—6, acetal, polybutylene terephthalate, etc. Each element body 14 includes a head portion 16 from which extend a pair of legs 18 and 20 in opposed directions. The legs 18 are molded on parallel connecting threads 22 extending lengthwise in the train 12 while the legs 20 are molded on a second pair of connecting threads 24 extending lengthwise in the train 12 to thus interconnect all of the element bodies 14 to form the continuous train 12. Each of the legs 18 and 20 terminates in respective heel portions 19 and 21. During the folding and forming by the apparatus 10, the legs 18 and 20 are bent through approximately a 90° angle about their junctions with the head portion 16 so that, as shown in FIG. 3, the legs 18 and 20 extend in substantially the same direction, with the pairs of connecting threads 22 and 24 and the heel portions 19 and 21 being adjacent one another. The pairs of connecting threads 22 and 24 in addition to interconnecting the elements can also serve as support members secured to carrier tape edges (not shown) in a conventional manner to form a slide fastener stringer.

In the apparatus 10 for folding and forming the train 12 of element bodies 14, as shown in FIGS. 1 and 4 through 6, the folding wheel 32 and the press wheel 34 are mounted on respective shafts 36 and 38 which are driven in synchronism in opposite directions, as indicated by the arrows 37 and 39, by a suitable power source, not shown. The wheel 34 includes a center forming disc 46 mounted on the shaft 38 between a pair of blocking or spacing discs 48 which have radii less than the radius of the forming disc 46 by a difference slightly greater than the length of the element legs 18 and 20. The forming disc 46, or at least its periphery, has a thickness about equal to the desired spacing between the legs 18 and 20 of the U-shaped elements of FIG. 3. The spacing discs 48 have thickness about equal to the thickness of the legs 18 and 20. A pair of flexible discs 52 are mounted on the shaft 38 outside of respective ones of the spacing discs 48 and have radii about equal to or slightly greater than the radius of the forming disc 46. Thus the discs 46, 48 and 52 form a pair of annular grooves on the periphery of the forming wheel 34 for receiving the respective bent legs 18 and 20 of the coupling elements 14, the grooves being between the discs 52 on respective opposite sides of the disc 46 and having bottoms defined by the discs 48. A stationary wedge block 62 is mounted in front of an entry point or station indicated generally at 49 and has a disc receiving channel 64 between a pair of bevelled abutment edges 66 for camming the peripheral portions of the flexible discs 52 away from the center forming disc 46 sufficiently to permit the element bodies 14 to be fed at the station 49 between the outer edges of the discs 52 with the elongated dimension of the element bodies 14 extending perpendicular to the forming disc 46. The center forming disc 46 has a smooth cylindrical periphery with lightly chamfered edges for engaging the interior surfaces of the heads 16 of the element body train 12 at the entry station 49.

The folding wheel 32 includes a head forming or engaging disc 40 sandwiched between a pair of fold discs 42. The head forming disc 40 has a thickness which is approximately equal to the thickness of the head portion 16 of each element body 14. The peripheral edges of the discs 42 extend past the outer edge of the disc 40, and just after the station 49, rotate into interdigitation with the respective flexible discs 52 and the forming disc 46 for engaging the legs 18 and 20 to bend the legs about the junctions with the head portions 16 over the respective sides of the forming disc 46. The head forming disc 40 has a grooved peripheral edge 41 for cooperating with arcuate portions 43 on the discs 42 to bend the legs 18 and 20 and form the coupling elements bodies into V-shaped element bodies, viewed sideways in FIG. 4, which have their bent leg portions extending on opposite sides of the periphery of the disc 46. The fold discs 42 have respective bevelled edges 54 on their outside peripheral edges for engaging the inner surfaces of the peripheral portions of the flexible discs 52 to hold the discs 52 apart. In order to affirmatively force the edges of the flexible discs 52 back into a flattened state, a pair of stationary annular press bands 56 are mounted around approximately 230° of the circumference of the wheel 34, extending between points spaced past the disengagement point of the wheels 32 and 34 and spaced in front of the exit point 15. The bands 56 cause the flexible discs 52 to bear down on the legs 18 and 20 during the continued rotation of the wheel.

A head modifying roller 60 is mounted adjacent the periphery of the wheel 34, at a point on the periphery where the flexible discs 52 are being acted upon by the bands 56. The roller 60 is positioned relative to the forming disc 46 so that the rotation of the forming disc 46 sequentially brings the head portions 16 of the bodies 14 into engagement with the roller 60 and the roller 60 exerts pressure radially to the disc 46 on the head portions 16 to force the inside surfaces of the head portions against the periphery of the disc 46 to form such inside surfaces to the cross-sectional shape of the center forming disc periphery.

Figure 7:
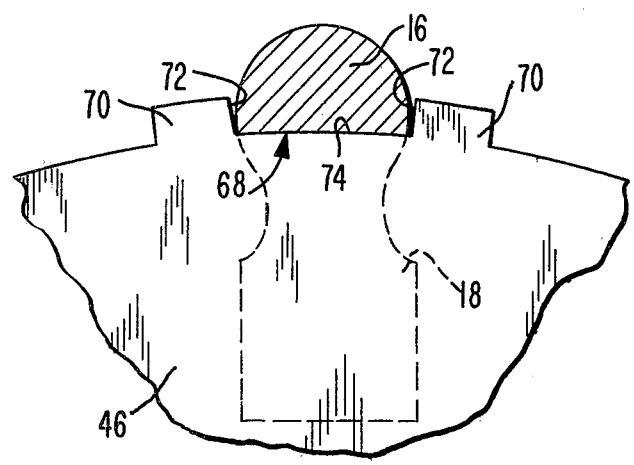
FIG. 7 is an enlarged plan view of a broken-away portion of a modified center forming disc which can be substituted in the the apparatus of FIG. 1.

In a modified center forming disc 46 of FIG. 7, the disc 46 has a plurality of teeth 70 formed on its peripheral edge and which are spaced and shaped to form troughs or notches 68 for receiving the heads 16 of the element body train 12 at the entry station 49. The troughs 68 have bottom surfaces 74 and side walls 72 for impressing desired configurations to the bottom and front and rear faces of the element head portion 16. In FIG. 7 the sidewalls 72 extend substantially along radii of the disc 46 with the bottom surface 74 being substantially straight between the sidewalls 72.

Figure 8:
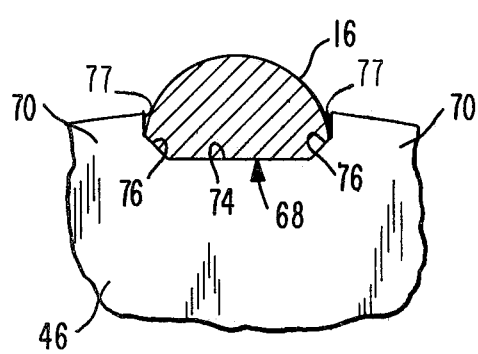
FIG. 8 is a view similar to FIG. 7 but of another modified center forming disc.
Figure 9:
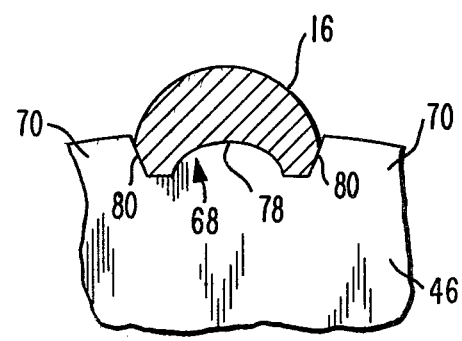
FIG. 9 is a view similar to FIGS. 7 and 8 but of a further modified center forming disc.
Figure 10:
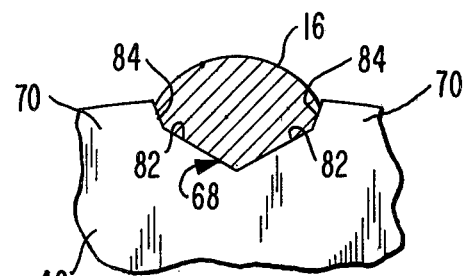
FIG. 10 is a view similar to FIGS. 7-9 but of a still further modified center forming disc.

In FIGS. 8 through 10 there are shown some other variations of the trough 68 defined between the teeth 70 on the periphery of the forming disc 36. In FIG. 8, the forming trough 68 is defined by inclined edge portions 76 extending angularly upward from the flat head receiving surface 74 and terminating at edge portions 77 extending radially relative to the disc 46 for forming knuckles on the heads 16 to enhance the external interlocking characteristics of the element head portion 16. In FIG. 9, a semicircular projection 78 extends upward from the central portion of the bottom of the trough 68 for forming voids or recesses in the inner bottom faces of the head portions 16. The teeth 70 have bevelled edges 80 for modifying the external profile of the head portion 16 to enhance the locking characteristics. In a still further variation of the trough 68, shown in FIG. 10, the head receiving surface is formed from a pair of angular surfaces 82 defining a V-shaped bottom surface, which surfaces 82 extend upwardly and outwardly from the center of the trough 68 to a pair of slightly bevelled edges 84 on the teeth 70.

Figure 4:
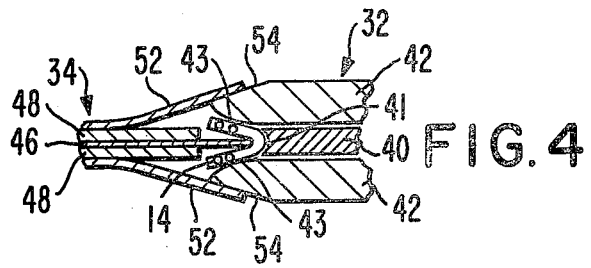
FIG. 4 is a cross-sectional view taken along the line 4—4 of FIG. 1 of a broken-away portion of the apparatus.
Figure 5:
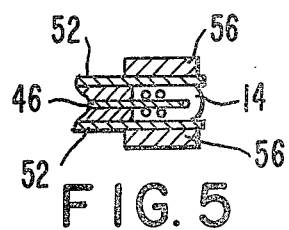
FIG. 5 is a cross-sectional view taken along the line 5—5 of FIG. 1 of a broken-away portion of the apparatus.

In operation of the apparatus 10 the forming wheel mechanism 34 and the folding wheel mechanism 32 are rotated in opposite directions as shown by the arrows 39 and 37. The continuous train 12, formed in the molding unit 30, is fed while in a heated state, typically about 149° C. (300° F.), to the entry and folding station 49. The peripheral edges of the flexible discs 52 are spread apart by the camming engagement with the surfaces 66 of the wedge block 62 prior to the entry station 49, and are held in this spread apart condition by engagement with the edges 54 on the fold discs 42 so that, at the entry station 49, the head portion 16 of each of the element bodies 14 in the train 12 is received in a trough 68 on the rotating forming disc 46 with the leg portions 18 and 20 extending outwardly perpendicular to the disc 46. The rotation of the disc 46 brings the leg portions of each sequential element 14 into engagement with the outer edges of the folding discs 42 of the rotating fold wheel 32. The rotating of the forming wheel mechanism 34 and the folding wheel mechanism 32 and the interdigitation of the peripheral portions of the folding discs 42 between the edges of the respective flexible discs 52 and the forming disc 46 engages the legs 18 and 20 with the arcuate edges 43 and bends the legs 18 and 20 about their junctions with the head portions 16 toward one another over respective sides of the forming disc 46 as shown in FIG. 4. The head forming disc 40 pushes against the head portion 16 of the element 14 and insures that the head portions 16 are seated in the forming troughs 68. As the wheel 34 rotates it draws the train 12 past the entry point 40 and the flexible discs 52 disengage from the bevelled edges 54 of the wheel 32. The peripheries of the discs 52 flex back to a flattened state engaging the spacing discs 48 and complete the folding of the element legs 18 and 20 against the respective sides of the forming disc 46.

By folding the bodies 14 while the interior portions of the bodies are still in a plastic state immediately after exiting the molding unit 30, the molecular configuration of the thermoplastic material remains oriented through the folded junction of the leg portions 18 and 20 and the head portion 16. This enhances the strength of the elements 14 by maintaining the longitudinal orientation of the molecules of the synthetic polymer resin created at molding. In prior art processes where the bodies are allowed to cool and are then reheated prior to folding, the interior portions of the bodies are generally in a cooler state and molecular orientation and strength is substantially deteriorated by the folding. In modifications of the present process, the element bodies 12 may be cooled and reheated after molding, and/or the pressure pads 56 or portions thereof maybe heated to bring about proper thermosetting of the polymer.

After the discs 52 return to a flattened state and force the leg portions 18 and 20 against respective sides of the forming disc 46, the peripheries of the discs 52 and the disc 46 rotate with the wheel 34 between the stationary press bands 56. As the wheel 34 rotates, the bodies of the folded element train further cool and become set in a U-shape.

While rotating under the pressure from the press bands, the head portions 16 of the train 12 come into engagement with the head modifying roller 60 and are pushed into the troughs 68. The roller 60 pushes down on the head portions 16 with sufficient force to seat the elements firmly and thus cause the configuration of the periphery of the disc 46 be impressed in the inner faces of the head portions 16.

After approximately 300° of rotation on the wheel 34, the folded and formed coupling element train 13 is removed from the wheel 34 at the removal station 15 adjacent the wedge block 62. The spreading of the peripheral edges of the flexible discs 52 by the pair of bevelled surfaces 66 on the wedge block 62 disengages the discs 52 from the leg portions 18 and 20 allowing the train 13 to be pulled from the forming disc 46.

Figure 11:
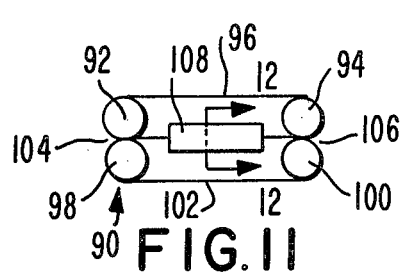
FIG. 11 is a diagrammatic elevation view of a sizing apparatus in accordance with the present invention.
Figure 12:
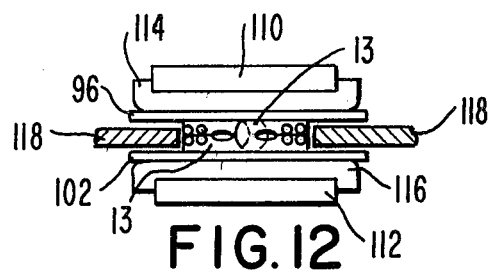
FIG. 12 is a cross-sectional view taken along the line 12—12 of FIG. 11.

After the coupling element train 13 has been drawn from the apparatus 10, the train 13 may then be optionally fed to a sizing unit, indicated generally at 90 in FIG. 11. A first pair of rollers 92 and 94 drive a first guide band 96 in a counterclockwise oval pattern while a second pair of rollers 98 and 100 drive a second guide band 102 in a clockwise oval pattern, matching that of the first band 96. The rollers 92, 94, 98 and 100 are driven in synchronism by any suitable power source, not shown. The rollers 92 and 98 are rotated on parallel axes adjacent one another at an entry point 104 to the unit 90. Similarly, the rollers 94 and 100 rotate on parallel axes adjacent an exit point 106 of the unit 90. The close proximity of the opposed rollers 92, 98 and 94, 100 causes the bands 96 and 102 to travel along a path adjacent one another from the entry point 104 to the exit 106. Centrally located along this path is a sizing unit 108, shown in detail in FIG. 12.

The sizing unit 108 includes a pair of opposed heating pads 110 and 112 located above and below the bands 96 and 102 respectively. The pads 110 and 112 are isolated from the bands 96 and 102 by slip bands 114 and 116 respectively which protect the heating pads 110 and 112 from frictional wear due to the moving bands 96 and 102. A pair of lateral barriers 118 form the sides of a chain receiving channel defined by the bands 96, 102 and the barriers 118.

In the operation of the unit 90, two trains 13, formed and folded by a pair of the apparatus 10, are pulled from the apparatus 10 and intermeshed and fed into the unit 90 at the entry point 104. The intermeshed trains 13 are advanced by the bands 96 and 102 through the unit 108 where the heat supplied at the heating pad 110 and 112 causes the elements 14 to soften. The element legs 18 and 20 and the head portions 16 are compressed under the pressure applied by the bands 96 and 102. The gap between the slip bands 114 and 116 controls the width and thickness of the train 13. In the continuous operation of the apparatus 10 and the unit 90, the pitch of the resultant fastener trains may be altered by varying the relative speed between the apparatus 10 and the unit 90.

Since many modifications, variations and changes in detail may be made to the described embodiments, it is intended that all matter in the foregoing description and shown in the drawings be interpreted as illustrative and not in a limiting sense.

What is claimed is:

1. A method of folding and forming a continuous train of flat slide fastener coupling element bodies into a train of slide fastener coupling elements, the method comprising the steps of rotating a forming disc;

feeding the flat element bodies of the train of flat coupling element bodies in a heated condition to the periphery of the rotating forming disc;

folding leg portions of the element bodies onto opposite sides of the forming disc;

engaging a pair of flexible discs with the folded leg portions on the opposite sides of the forming disc;

maintaining the engagement of the discs with the folded leg portions for a portion of the forming disc rotation to form the train of slide fastener coupling elements; and removing the train of slide fastener coupling elements from the forming disc.

2. A method as claimed in claim 1 wherein the folding step includes pushing the element leg portions toward the axis of the forming disc with a pair of spaced discs on a folding wheel.

3. A method as claimed in claim 1 wherein the maintaining step includes holding the flexible discs against the element leg portions with a pair of press bands.

4. A method as claimed in claim 1 wherein the feeding step includes feeding the flat element bodies of the train of flat coupling element bodies in a heated condition to the rotating forming disc such that the head portions of the element bodies are positioned in successive troughs defined by teeth in the forming disc periphery.

5. A method as claimed in claim 1 or 4 wherein the maintaining step includes passing the train under a head modifying roller to shape the head portions.

6. A method as claimed in claim 1 wherein the removing step includes camming the flexible discs outward with a wedge block.

7. A method as claimed in claim 1 comprising the further steps of intermeshing a pair of the coupling element chains and feeding the intermeshed chains to a sizing unit.

8. A method as claimed in claim 1 wherein the feeding step includes spreading the pair of flexible discs outwardly from the forming disc.

9. A method as claimed in claim 8 wherein the feeding step includes holding the pair of flexible discs outward from the forming disc with a folding wheel.

* * * * *